No. 828,749. PATENTED AUG. 14, 1906.
W. A. KLINGBERG.
CHANGEABLE SPEED GEARING FOR AUTOMOBILES.
APPLICATION FILED JAN. 29, 1906.

Witnesses

Inventor
W. A. Klingberg,
By
Lacey, Attorneys

UNITED STATES PATENT OFFICE.

WILLIAM A. KLINGBERG, OF ELMO, KANSAS.

CHANGEABLE-SPEED GEARING FOR AUTOMOBILES.

No. 828,749.	Specification of Letters Patent.	Patented Aug. 14, 1906.

Application filed January 29, 1906. Serial No. 298,523.

*To all whom it may concern:*

Be it known that I, WILLIAM A. KLINGBERG, a citizen of the United States, residing at Elmo, in the county of Dickinson and State of Kansas, have invented certain new and useful Improvements in Changeable-Speed Gearing for Automobiles, of which the following is a specification.

This invention appertains to gearing, being particularly designed for mechanically-propelled vehicles whereby different speeds may be obtained and the machine reversed as occasion may require, the purpose being to devise a power-translating mechanism which will embody a minimum number of coöperating elements and which will be compact, effective, and adapted to be easily controlled and not liable to get out of repair.

For a full description of the invention and the merits thereof and also to acquire a knowledge of the details of construction of the means for effecting the result reference is to be had to the following description and accompanying drawings, While the invention may be adapted to different forms and conditions by changes in the structure and minor details without departing from the spirit or essential features thereof, still the preferred embodiment is shown in the accompanying drawings, in which—

Figure 1:
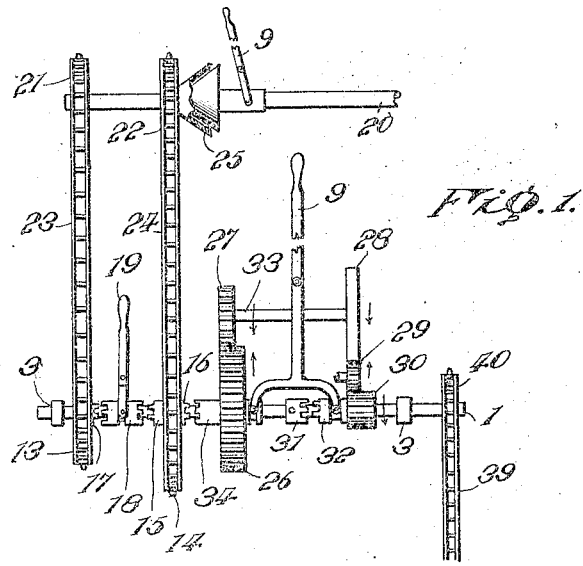
Figure 2:
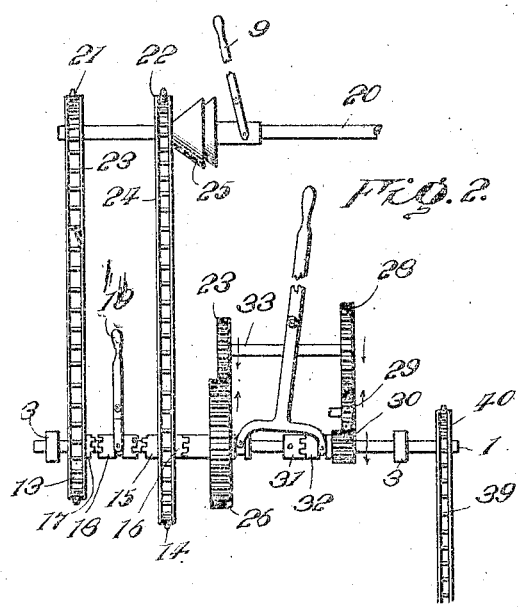

Figure 1 is a top plan view of a power-transmitting gearing embodying the invention. Fig. 2 is a detail view illustrating the reversing mechanism thrown into gear.

Corresponding and like parts are referred to in the following description and indicated in both the views of the drawings by the same reference characters.

The mechanism embodies a shaft 1, which is the recipient of the power to which the axle of the mechanism or the drive-wheels thereof are connected. The shaft 1 is mounted in bearings 3, which may be of any structural type and supported in any manner dependent upon the nature of the machine to which the invention is applied. A lever 9 is conveniently arranged upon the machine, so as to be readily accessible from the driver's seat or other point to enable said lever to be readily operated.

Two sprocket-wheels 13 and 14 are loosely mounted upon the shaft 1 and are of different diameters, so as to effect different speeds. The sprocket-wheel 14 is of larger diameter than the sprocket-wheel 13 and is provided upon opposite sides with half-clutches 15 and 16. The sprocket-wheel 13 is provided upon one side only with a half-clutch 17. A sleeve 18 is slidably mounted upon the shaft 1 between the sprocket-wheels 13 and 14 and is keyed to said shaft, so as to rotate therewith. Half-clutches are formed or otherwise provided at opposite ends of the sleeve 18 for coöperation with the half-clutches 15 and 17, so as to cause one or the other of the sprocket-wheels 13 and 14 to rotate with the shaft 1. A lever 19 is arranged for coöperation with the sleeve 18 to effect a movement thereof to cause either one of the sprocket-wheels 13 or 14 to become clutched to the shaft 1 or to admit of both sprocket-wheels rotating without imparting movement to said shaft, in which case the sleeve 18 occupies an intermediate position.

The numeral 20 designates a power-driven shaft, which may be the crank-shaft of an engine or other shaft connected with a suitable source of power, so as to be driven thereby. Connected sprocket-wheels 21 and 22 are loosely mounted upon the shaft 20 and are connected, respectively, by sprocket-chains 23 and 24 with the sprocket-wheels 13 and 14. The sprocket-wheels 21 and 22 may be connected in any manner, so as to rotate as a single part and are adapted to be connected wth the shaft 20 by means of a suitable clutch 25, the latter providing convenient means for throwing the power-transmitting mechanism into and out of gear with reference to the source of power.

A reversing mechanism is provided and coöperates with the shaft 1 and admits of reversing the machine without necessitating a stoppage of the primary motive power. The reversing mechanism consists of a train of gearing, which embodies spur-gears 26, 27, 28, 29, and 30, and a clutch device comprising clutch members 31 and 32. The spur-gears 26 and 32 are loose upon the shaft 1. The spur-gears 27 and 28 are fast to a shaft 33, the spur-gear 27 being in mesh with the spur-gear 26 and the spur-gear 28 being in mesh with the spur-gear 29 and the latter in turn meshing with the spur-gear 30. The spur-gears 26 and 32 are slidable upon the shaft 1 and are at the same time adapted to turn freely thereon. A half-clutch 34 is provided upon the side of the spur-gear 26 adjacent to the sprocket-gear 14 and is adapted to intermesh with the half-clutch 16 to cause the sprocket-wheel 14 and spur-gear 26 to rotate together. The spur-gear 30 is provided with the half-clutch 32 for coöperation with the half-clutch 31, so as to impart rotation to the shaft 1 in an opposite direction to the rotation of the sprocket-wheel 14, whereby admitting of the machine being quickly reversed without necessitating throwing of the motive power out of action or requiring the reversing thereof. The half-clutch 31 is fast to the shaft 1. The lever 9 is connected to the spur-gears 26 and 30 in a way to admit of simultaneous movement thereof in each direction.

It will be understood from the foregoing that the machine may be driven forward at two speeds according as one or the other of the spur-gears 13 and 14 is thrown into clutched engagement with the shaft 1 or is adapted to be reversed by operation of the lever 9 without necessitating a stopping of the engine or a reversing of the primary motive power. It will be further observed that the mechanism is exceedingly simple and that the parts are compactly arranged and are at all times under control and are further effective and not liable to derangement.

Power may be transmitted from shaft 1 to the part to be driven by any suitable means, as sprocket-chain 39 and sprocket-wheel 40, the latter being fast to the shaft 1.

The invention may be adapted to traction-machines, automobiles, or other mechanisms requiring to be driven at different speeds or to be reversed.

Having thus described the invention, what is claimed as new is—

In power-transmitting gearing of the character specified, the combination of a shaft, a gear element loose thereon, a clutch coöperating with said gear element and the shaft to throw the parts into and out of clutched engagement, a reversing mechanism comprising a train of gearing having two of its elements loose upon said shaft, a clutch for throwing one of said loose gear elements into and out of clutched engagement with the first-mentioned gear element, and a clutch for throwing the other loose gear element into and out of clutched engagement with the said shaft.

In testimony whereof I affix my signature in presence of two witnesses.

WILLIAM A. KLINGBERG. [L. S.]

Witnesses:
 J. E. GLEASON,
 ELMER SHANE.